UNITED STATES PATENT OFFICE.

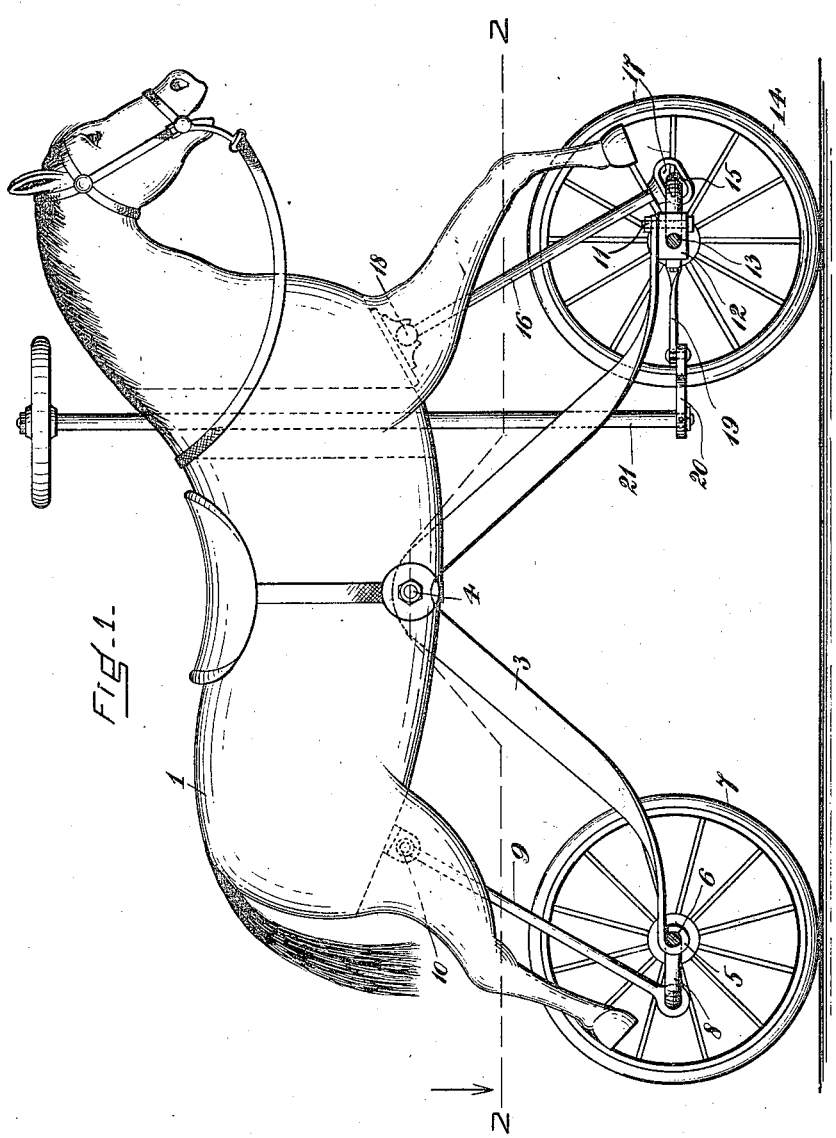

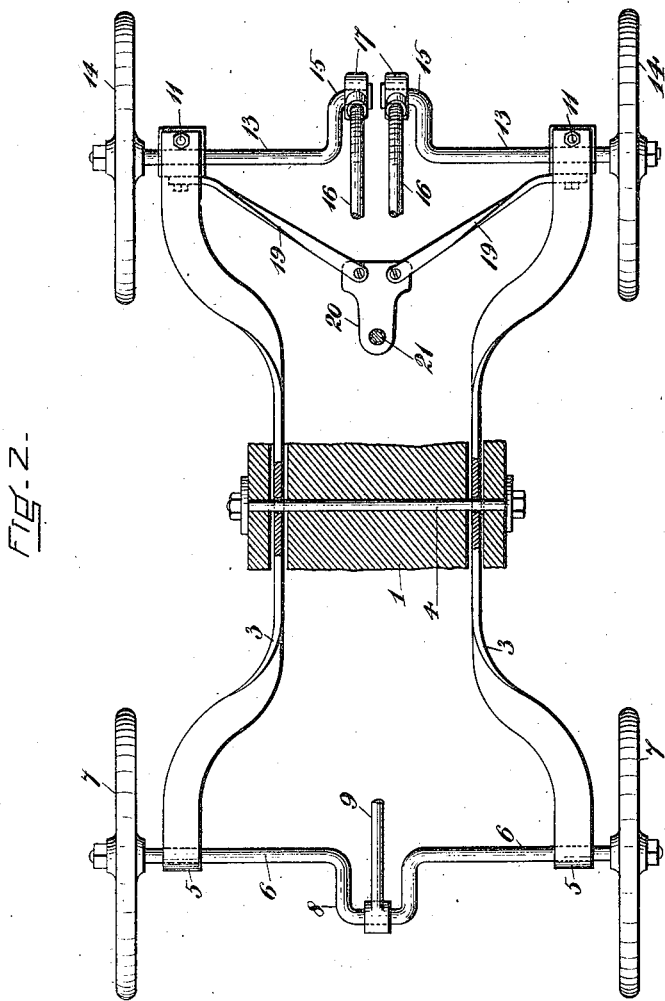

ALBERT O. MORSE, OF LEOMINSTER, MASSACHUSETTS.

ROCKING-HORSE.

1,285,315.　　　　　　　Specification of Letters Patent.　　Patented Nov. 19, 1918.

Application filed March 8, 1917. Serial No. 153,251.

*To all whom it may concern:*

Be it known that I, ALBERT O. MORSE, a citizen of the United States, residing at Leominster, county of Worcester, State of Massachusetts, have invented an Improvement in Rocking-Horses, of which the following description, in connection with the accompanying drawing, is a specification, like characters on the drawing representing like parts.

This invention relates to rocking horses and has for its object to provide a novel rocking horse constructed so that the rocking movement thereof will propel the horse forwardly or backwardly as desired. I accomplish this by mounting the horse on wheels and providing propelling mechanism for the wheels which is actuated by the rocking motion of the horse. The rocking horse is also provided with means for steering it so that the child who is mounted on the horse can both propel himself forwardly and backwardly and direct his progress at will.

In order to give an understanding of my invention, I have illustrated in the drawings a selected embodiment thereof which will now be described, after which the novel features will be pointed out in the appended claims.

Figure 1 of the drawings is a side view of a rocking horse embodying my invention;

Fig. 2 is a section on the line 2—2, Fig. 1.

1 indicates the rocking horse which may be made in any suitable way. The rocking horse 1 is pivotally mounted centrally thereof on a frame 2 which in turn is mounted on wheels. The frame herein illustrated comprises the two side bars 3 which are bent upwardly at their central portion and which are pivoted to the rocking horse 1 by the pivotal connection 4. The body of the rocking horse will preferably be provided with slots into which the apex of the angular portions of the side bars 3 are received, the pivotal connection 4 being in the form of a bolt or rod carried by the body of the rocking horse and extending through apertures formed in said apices. The rear ends of the side bars 3 are formed with the bearings 5 in which is journaled a rear axle 6 having wheels 7 rigid therewith. This rear axle is provided with the cranked portion 8 which is connected by a connecting rod 9 to the rocking horse at 10.

Owing to the crank construction of the rear axle, it will be seen that as the horse rocks about its pivotal support 4, the rear axle will be rotated, thus propelling the vehicle forwardly.

The frame is sustained at its front end by a front axle which is also a crank axle and is pivotally connected to the front of the horse 1 so that the rocking action of the horse will serve to give rotation to both the front and rear axles.

In order to provide for steering the rocking horse, I propose to make the front axle in two sections and to provide means for turning said sections thereby to swing the front wheels into different angular positions. The two sections of the front axle are indicated at 13 and each has a wheel 14 fast thereon and is journaled in a bearing 12 that is pivoted to the front end of one of the side bars 2, as at 11, the pivot being such as to permit the bearing 12 to swing about a vertical axis. The inner end of each section 13 is provided with a crank 15 and each crank is connected to the front end of the rocking horse 1 by a connecting rod 16. I will preferably employ a ball-and-socket connection 18 between each connecting rod 16 and the rocking horse 1 and will also provide the lower end of each connecting rod 16 with a slot 17 in which the crank 15 is received. The reason for this construction is to prevent the cranks 15 from binding when the axle sections 13 are swung into different angular positions. The two bearings 12 have links 19 connected thereto, and these links are in turn pivotally connected to an arm 20 which is fast on a steering post 21 that extends vertically through a slot formed in the rocking horse 1. The turning of the steering post 21 will swing the bearings 12 about their vertical axes 11 and will thus move the steering wheels 14 into different angular positions. The ball-and-socket joint and the slots 17 permit the cranks 15 to be turned without any binding action, notwithstanding such angular movement.

The cranks on the front and rear axles are oppositely disposed so that when the rocking horse is turned in either direction about its pivot, propelling power will be applied to both front and rear axles. The person mounted on the horse can easily operate it by simply causing the horse to rock back and forth about its pivot 4, such rocking movement acting through the connecting rods 9 and 16 to turn the crank axles 6 and 13. The device can also be easily steered.

While I have illustrated herein a selected embodiment of my invention, I do not wish to be limited to the constructional features shown.

I claim:

1. In a rocking horse, the combination with a frame, of a front axle journaled therein, a rear axle also journaled therein, traction wheels on both of said axles, a horse member pivotally mounted on the frame, separate connecting rods connecting said horse member to each crank axle whereby rocking movement of the horse member on its pivot will rotate both crank axles, and means coöperating with the front axle for steering the rocking horse as it is propelled.

2. In a device of the class described, the combination with a frame, of a rear crank axle journaled therein, wheels mounted thereon, a front axle also journaled in said frame and comprising two sections, each having a crank and being capable of angular turning movement, a rocking horse pivotally mounted on said frame, and connecting rods connecting said horse with the crank portion of each of said axles.

3. In a device of the class described, the combination with a frame, of a rear crank axle journaled therein, wheels mounted thereon, a front axle also journaled in said frame and comprising two sections, each having a crank and being capable of angular turning movement, a rocking horse pivotally mounted on said frame, connecting rods connecting said horse with the crank portion of each of said axles, and means for turning said front axle sections thereby to steer the device as it is propelled.

4. In a device of the class described, the combination with a frame, of a rear axle journaled therein and provided with wheels, said axle having a cranked portion, of two bearings swiveled to said frame, a front axle section journaled in each bearing, a steering wheel on each front axle section, each front axle section having a crank, a rocking horse pivoted centrally to said frame, connecting rods connecting said horse with each of said cranks, and a steering post connected to the bearings for the front axle sections and by which the steering wheels may be turned.

5. In a device of the class described, the combination with a frame, of a rear axle journaled therein and provided with wheels, said axle having a cranked portion, two bearings swiveled to said frame, a front axle section journaled in each bearing, a steering wheel on each front axle section, each front axle section having a crank at its inner end, a rocking horse pivoted centrally to said frame, a connecting rod connecting said horse with the cranked portion of the rear axle, other connecting rods connecting said horse with the cranked portion of each crank axle section, each of the latter connecting rods having a ball-and-socket connection with said horse, and a steering post connected to the bearings for the front axle sections and extending upwardly through a slot in the horse.

In testimony whereof I have signed my name to this specification.

ALBERT O. MORSE.